Oct. 25, 1927.
H. J. BARNHART
1,646,781
STEAM SHOVEL
Filed Nov. 3, 1921
2 Sheets-Sheet 2
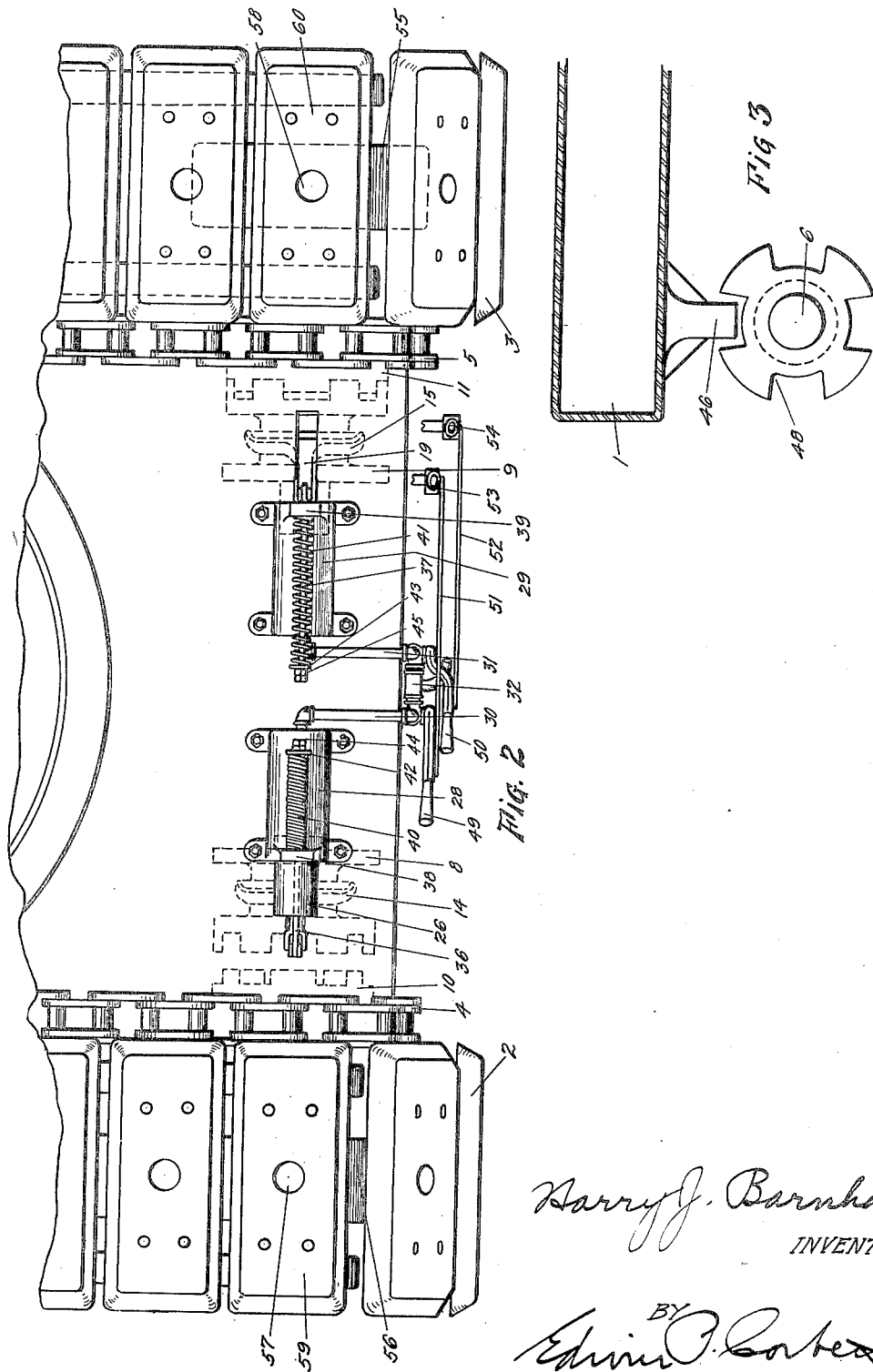

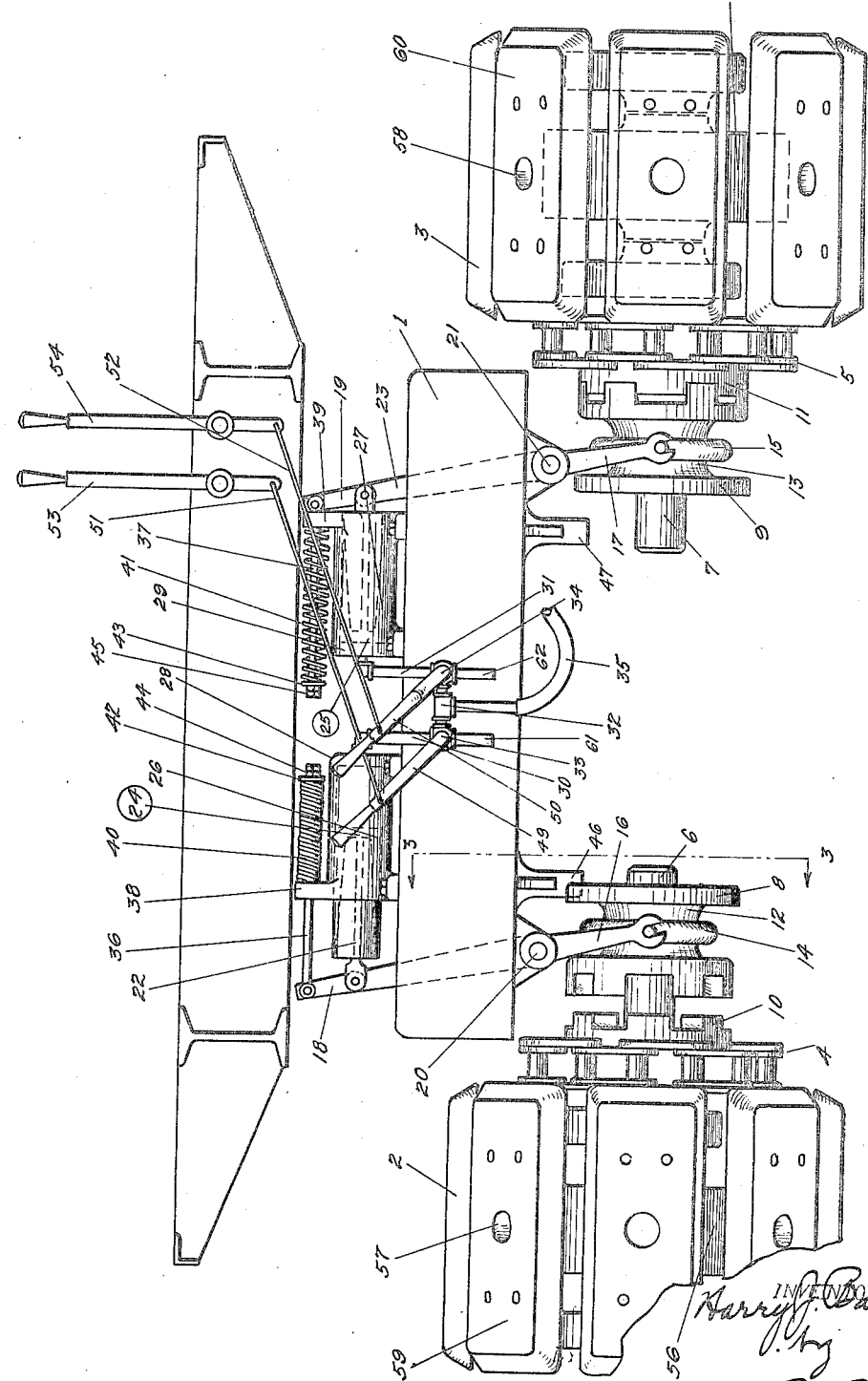

Patented Oct. 25, 1927.

1,646,781

UNITED STATES PATENT OFFICE.

HARRY J. BARNHART, OF MARION, OHIO, ASSIGNOR TO THE OSGOOD COMPANY, OF MARION, OHIO, A CORPORATION OF OHIO.

STEAM SHOVEL.

Application filed November 3, 1921. Serial No. 512,520.

My invention relates to steam shovels or power excavating means of the type generally known as endless chain traction steam shovels and has to do with the provision of a simple and positively operated means for steering the same. It is customary to steer steam shovels of this type by disconnecting one of the traction units from its positive drive while maintaining the other traction unit in connection with its positive mechanism.

I have provided a novel form of steering mechanism which makes possible the ready disconnection of either traction unit under the control of a balanced power followed by the automatic locking of the disconnected traction unit. This balanced power is of such a nature and so applied that the parts will be positively moved in either direction to effect connection or disconnection of the traction unit and yet practically all jar normally resulting from movement of parts of this nature will be eliminated.

My invention preferably takes the form of a clutch member for each traction unit which is movable into and out of driving connection with the unit by means of a fluid motor and a spring, one acting to move the clutch in one direction and the other acting to move the clutch in the opposite direction but both acting against each other in some measure in the performance of their respective functions. Thus, when the fluid pressure device moves the clutch, this movement is resiliently opposed by the spring and when the spring moves the clutch this movement is resiliently opposed by a fluid cushion, due to the partially exhausted fluid in the fluid pressure device.

The preferred embodiment of my invention is shown in the accompanying drawings wherein similar characters of reference designate corresponding parts and wherein Figure 1 is a front elevation of a steam shovel truck together with the traction units therefor and showing my invention applied thereto.

Figure 2 is a plan view of the structure shown in Figure 1.

Figure 3 is a detail taken on line 3—3 of Figure 1 and showing the automatically effective means for locking a disconnected traction unit against rotation.

In the drawings, the truck of a steam shovel is shown at 1 as being mounted upon traction units 2 and 3. The positive driving elements of these traction units take the form of sprocket and chain constructions 4 and 5 which are only effective to positively drive the shafts 6 and 7 by means of clutch members 8 and 9 that are movable into and out of clutching relation with jaw teeth 10 and 11 upon the sprocket driven by the sprocket chains.

The movable clutch members are provided with annular grooves 12 and 13 within which fit collars 14 and 15 which are loosely connected to the bifurcated ends of yoke members 16 and 17 of levers 18 and 19. These levers 18 and 19 are fulcrumed as at 20 and 21.

Positively connected to the ends of the levers 18 and 19 are piston rods 22 and 23. The opposite ends of these piston rods fit loosely in sockets 24 and 25 in pistons 26 and 27. These pistons are mounted to reciprocate in open ended cylinders 28 and 29.

The closed ends of these cylinders, which are the inner ends, are provided with fluid inlet pipes 30 and 31 which lead from a T 32 and which are respectively provided with hand-operated valves 33 and 34. Leading from the T is a flexible piping 35 that is preferably extended upwardly into the steam shovel housing where it is supplied with steam from the boiler.

Connected to the upper extremities of the levers 18 and 19 are rods 36 and 37 and these rods extend inwardly and pass through apertured brackets 38 and 39 upon the outer ends of the cylinders 28 and 29. The rods are surrounded by springs 40 and 41 inside of the brackets 38 and 39 and whose outer ends bear against these brackets while their inner ends bear against collars 42 and 43 that may be held in position by adjustable lock nuts 44 and 45.

Immediately above the inner ends of the shafts 6 and 7 and depending from the truck 1 are rigid dog members 46 and 47 and these dog members are adapted to cooperate with cutaway portions 48 in the flanges 8 and 9 of the movable clutch members, the function of these parts being explained in the description of operation.

The valves 33 and 34 are preferably provided with hand levers 49 and 50 so that these valves may be operated from the ground if desired. However, these hand levers 49 and 50 are connected by means of detachable link members 51 and 52 with levers 53 and 54 that are mounted upon the cab of the steam shovel. Thus, the steering of the shovel structure may be effected either by initially setting the levers upon the truck or by operating these levers from the cab by means of the members 53 and 54.

In the normal running of the steam shovel along a straight road, both movable clutch members are in operative engagement with the jaw teeth 10 and 11 with the result that the power is transmitted from the positively driven sprocket members 4 and 5 through the clutch members to the shafts 6 and 7. These shafts 6 and 7 then drive the traction units by means of main sprocket members 55 and 56 whose teeth fit in apertures 57 and 58 in the tread members 59 and 60. In this position, both of the springs 40 and 41 are distended and hold the movable clutch members in their driving position.

Whenever it is desired to effect turning of the steam shovel to one side or the other, one of the valves 33 or 34 is operated to admit steam or other fluid pressure to the cylinder on the side toward which the turn is to be made. An illustration of this is had in Figure 1 where steam is being introduced into the cylinder 28 with the result that the piston 26 has been forced outwardly and has operated to move the lever 18 so as to move the movable clutch member out of driving position. Since the traction unit on this side continues in contact with the ground, the shaft 6 continues to rotate with the flange member 8 in contact with the depending dog 46. However, as soon as one of the cutaway portions 48 of this flange 8 registers with this dog 46, the movable clutch member is moved further inward so that the dog enters the cutaway portion and stops further rotation of the movable clutch member with the result that rotation of the traction unit entirely ceases. It should be noted that this movement of the clutch member by the steam pressure is somewhat resisted by the spring 40 with the result that the movements of the parts is effected without jar. Then, when the proper amount of turning has been accomplished, the valve 33 is turned to position to permit exhaust of the steam from the cylinder 28 through the exhaust pipe 61, whereupon the spring 40 moves the movable clutch member back into driving position against the cushioning action of the steam which is thereby expelled from the cylinder 28. It will be apparent that turning in the opposite direction is effected in an identical manner by operation of the valve 34 and that after sufficient turning has been effected, the steam is caused to exhaust through exhaust pipe 62 in the manner explained.

It will be apparent that I have provided an extremely simple and effective steering mechanism with practically all of its parts within the area of the trunk frame and, therefore, out of the way of the dipper which, being more or less unwieldy, is constantly striking various parts of the steam shovel structure with a consequent danger of breakage of these parts. It will be obvious that I may use other forms of fluid motors or that some of the parts of this device may be transposed or altered without departing from the principles of my invention.

Having thus described my invention, what I claim is:

1. Power excavating shovel structure comprising traction units, means for driving said traction units, fluid motors including means for disconnecting said traction units from said driving means, and springs for connecting said traction units to said driving means, said motors and said springs being balanced against each other when in action.

2. Power excavating shovel structure of the endless chain type comprising a revolvable cab structure, means for driving said traction units, means for connecting said traction units to said driving means, means controllable from the cab for disconnecting said traction units from said driving means, said last two means being balanced against each other when in action, and means controllable from the cab for locking the traction units against movement.

3. Power excavating shovel structure comprising traction units, power means for driving said traction units, clutch members for connecting and disconnecting said traction units with said power means, fluid motors for moving said clutch members out of driving relation with said power means, and springs for urging said clutch members into driving relation with said power means, said fluid motors and springs being balanced against each other when in action.

4. Power excavating shovel structure comprising a traction unit, power means for driving said traction unit, a clutch member for connecting and disconnecting said traction unit with said power means, a locking device for said clutch member, a fluid motor for moving said clutch member out of driving relation with said power means, and a resilient means for urging said disconnected clutch member into driving relation with said power means, said last two named means being balanced against each other when in action.

5. Power excavating shovel structure comprising a traction unit, power means for driving said traction unit, a clutch member for connecting and disconnecting said traction unit with said power means, a fluid motor including a cylinder and a piston operable within said cylinder for moving said clutch member out of driving relation with said power means, a lever secured to said clutch member and said piston, and a spring secured to said lever for urging said clutch member into driving relation with said power means.

In testimony whereof I hereby affix my signature.

HARRY J. BARNHART.